(12) United States Patent
Chandrashekar et al.

(10) Patent No.: US 11,822,947 B2
(45) Date of Patent: Nov. 21, 2023

(54) AUTOMATED MANAGEMENT OF MACHINE IMAGES

(71) Applicant: Amazon Technologies, Inc., Seattle, WA (US)

(72) Inventors: Samartha Chandrashekar, Redmond, WA (US); Francois Daniels, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 673 days.

(21) Appl. No.: 16/698,431

(22) Filed: Nov. 27, 2019

(65) Prior Publication Data

US 2021/0157623 A1    May 27, 2021

(51) Int. Cl.
*G06F 9/455* (2018.01)
*H04L 67/00* (2022.01)

(52) U.S. Cl.
CPC .......... *G06F 9/45558* (2013.01); *H04L 67/34* (2013.01); *G06F 2009/4557* (2013.01); *G06F 2009/45595* (2013.01)

(58) Field of Classification Search
CPC ......... G06F 9/45558; G06F 2009/4557; G06F 2009/45595; H04L 67/34
See application file for complete search history.

(56) References Cited

U.S. PATENT DOCUMENTS

| 9,792,141 | B1 * | 10/2017 | Sethuramalingam ..... G06F 8/63 |
| 2010/0017512 | A1 | 1/2010 | Ciano et al. | |
| 2012/0324446 | A1 | 12/2012 | Fries et al. | |
| 2014/0013322 | A1 | 1/2014 | Freimuth et al. | |
| 2014/0282518 | A1 * | 9/2014 | Banerjee ................. G06F 21/53 718/1 |
| 2015/0160959 | A1 | 6/2015 | Bragstad et al. | |
| 2016/0210462 | A1 | 7/2016 | Chari et al. | |
| 2016/0274896 | A1 | 9/2016 | Bowen | |
| 2017/0212830 | A1 * | 7/2017 | Thomas .............. G06F 11/3668 |

(Continued)

FOREIGN PATENT DOCUMENTS

WO    2017106726 A1    6/2017

OTHER PUBLICATIONS

International Search Report and Written Opinion from PCT/US2020/059852 dated Feb. 18, 2021, pp. 1-11.

*Primary Examiner* — Jacob D Dascomb
(74) *Attorney, Agent, or Firm* — Robert C. Kowert; Kowert, Hood, Munyon, Rankin & Goetzel, P.C.

(57) ABSTRACT

Methods, systems, and computer-readable media for automated management of machine images are disclosed. A machine image management system determines that a trigger for a machine image build process has occurred. The machine image management system performs the machine image build process responsive to the trigger. The machine image build process generates a machine image, and the machine image comprises a plurality of operating system components associated with an application. The machine image is validated by the machine image management system for compliance with one or more policies. The machine image management system provides the machine image to one or more recipients. One or more compute resources are launched using the machine image, and the application is executed on the compute resource(s) launched using the machine image.

19 Claims, 8 Drawing Sheets

(56) References Cited

U.S. PATENT DOCUMENTS

| | | | |
|---|---|---|---|
| 2018/0121659 A1* | 5/2018 | Sawhney | G06F 21/566 |
| 2018/0129479 A1 | 5/2018 | McPherson et al. | |
| 2018/0159736 A1 | 6/2018 | Prinsloo et al. | |
| 2018/0189089 A1 | 7/2018 | Chen et al. | |
| 2018/0196654 A1 | 7/2018 | Bo et al. | |
| 2018/0336055 A1 | 11/2018 | Bernardini et al. | |
| 2019/0018715 A1* | 1/2019 | Behrendt | G06F 9/542 |
| 2019/0050250 A1 | 2/2019 | Morgan | |
| 2019/0163460 A1 | 5/2019 | Kludy | |
| 2019/0227830 A1 | 7/2019 | Karve et al. | |
| 2019/0286467 A1 | 9/2019 | Singh et al. | |
| 2020/0117509 A1* | 4/2020 | Wimmer | G06F 9/5066 |
| 2021/0019163 A1* | 1/2021 | Taylor | G06F 8/63 |
| 2021/0073018 A1* | 3/2021 | Ding | G06F 11/3664 |

* cited by examiner

AUTOMATED MANAGEMENT OF MACHINE IMAGES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

Distributed systems may include compute instances such as virtual machines. A virtual machine may be implemented using a machine image that includes software, such as an operating system, that runs on a physical compute instance. By running various applications on top of the operating system provided by the machine image, users may perform a variety of tasks.

Figure 1A:
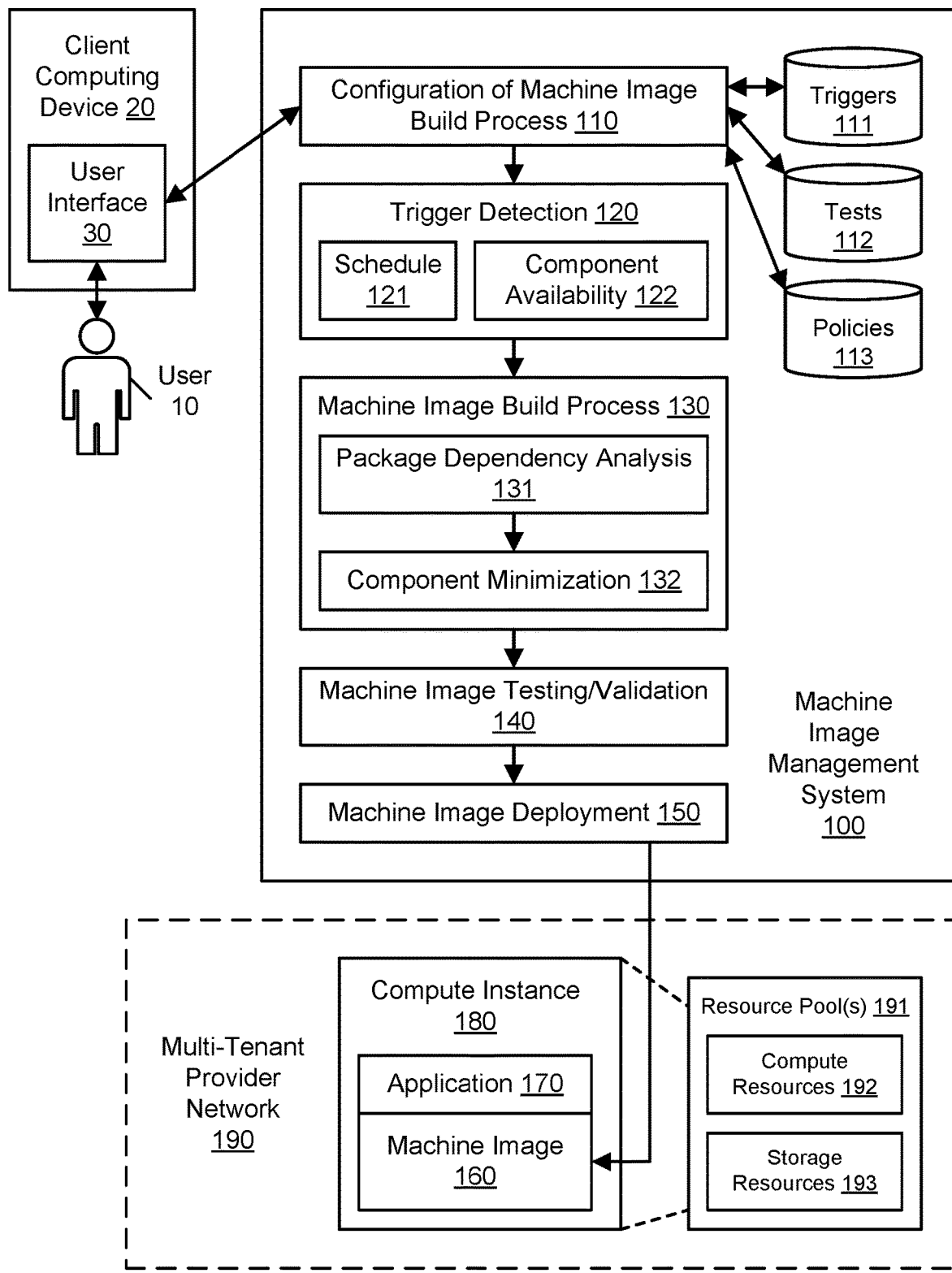
FIG. 1A, FIG. 1B, and FIG. 1C illustrate example system environments for automated management of machine images, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated management of machine images are described. A machine image may include components of an operating system that supports execution of applications. Machine images may be deployed to compute resources, e.g., virtual compute instances or physical compute instances implemented using compute resources of a multi-tenant provider network, containers, or resources implemented on customer premises. Using prior approaches, machine images were often updated manually when source components (e.g., a new build of an operating system or another component of the machine image) became available. The updated machine images were manually tested and then deployed to servers. Such manual processes for managing machine images were often time-intensive and resource-intensive. For example, a team of developers may have needed to interact with one or more teams of compliance experts in order to gain approval for a new machine image, and such back-and-forth interactions may have taken several days. During this time, critical security vulnerabilities may have gone unaddressed. Additionally, if problems or vulnerabilities with a new machine image were not detected during the building and testing, then costly service disruptions could occur once the machine image was used in a production environment.

The aforementioned challenges, among others, are addressed by embodiments of the techniques described herein, whereby machine images may be managed using a set of automated processes. A machine image management system may perform automated tasks for building, testing, validating, and deploying machine images, and the machine images may be customized for particular accounts. A machine image build process may be performed responsive to a trigger in order to generate a new or updated machine image. For example, a machine image may be built automatically based (at least in part) on the arrival of a scheduled time according to a user-specified or default schedule. As another example, an updated machine image may be built automatically based (at least in part) on the availability of an updated component of the machine image (e.g., a new build of the operating system or a pending security update). As yet another example, a machine image may be built automatically based (at least in part) on the availability of a new or updated test or policy for validating machine images. A machine image may be built to support a particular application. Package dependencies of the application may be used to include a minimal set ("just enough") of operating system components to support execution of the application and to exclude other components (e.g., components of the same operating system that are not needed to run the application). A machine image may be tested for use with a particular application, e.g., to validate that the image includes sufficient components for the application to execute as expected. A machine image may be validated against one or more policies applicable to a particular account. For example, a machine image may be validated for compliance with one or more organizational policies and/or industry-specific policies to ensure that the machine image handles sensitive data in a secure manner or is not subject to known security vulnerabilities for a particular solution domain. Distribution and access to machine images may be performed according to account-specific policies, e.g., with passing one or more policy compliance and/or usability tests as a precondition for distribution to one or more approved accounts. Machine images may be deployed to user accounts that are internal and/or external to a multi-tenant provider network so that compute resources (e.g., virtual compute instances, physical compute instance, containers) may be launched with deployed machine images to support execution of applications. "Golden" machine images may be further customized using a process of cascading image builds in which image build pipelines are chained to each other. By automating and streamlining management of machine images, images may be built automatically at appropriate times without time-consuming interactions between teams of developers and compliance experts, images may be hardened automatically against known vulnerabilities and tested for compliance with policies, and costly service disruptions may be avoided.

As one skilled in the art will appreciate in light of this disclosure, embodiments may be capable of achieving certain technical advantages, including some or all of the following: (1) improving the speed of using computers to build machine images by largely automating the machine image build process and thus eliminating time-consuming interactions with users; (2) improving the security of machine images by automatically validating the images against security policies; (3) improving the security of machine images by including only a minimal set of components needed to run a particular application; (4) reducing storage requirements for machine images by including only a minimal set of components needed to run a particular application; (5) reducing the use of computational resources, storage resources, and network resources by automatically performing a machine image build process according to a schedule and not necessarily every time a component of the image is updated; (6) improving the security of machine images by storing metadata usable to trace the lineage of a machine image; (7) improving the security of machine images and applications by automatically rebuilding and deploying images when pending security updates are published for an operating system, thereby reducing the time for which deployed applications are vulnerable to new security threats; and so on.

Figure 1B:
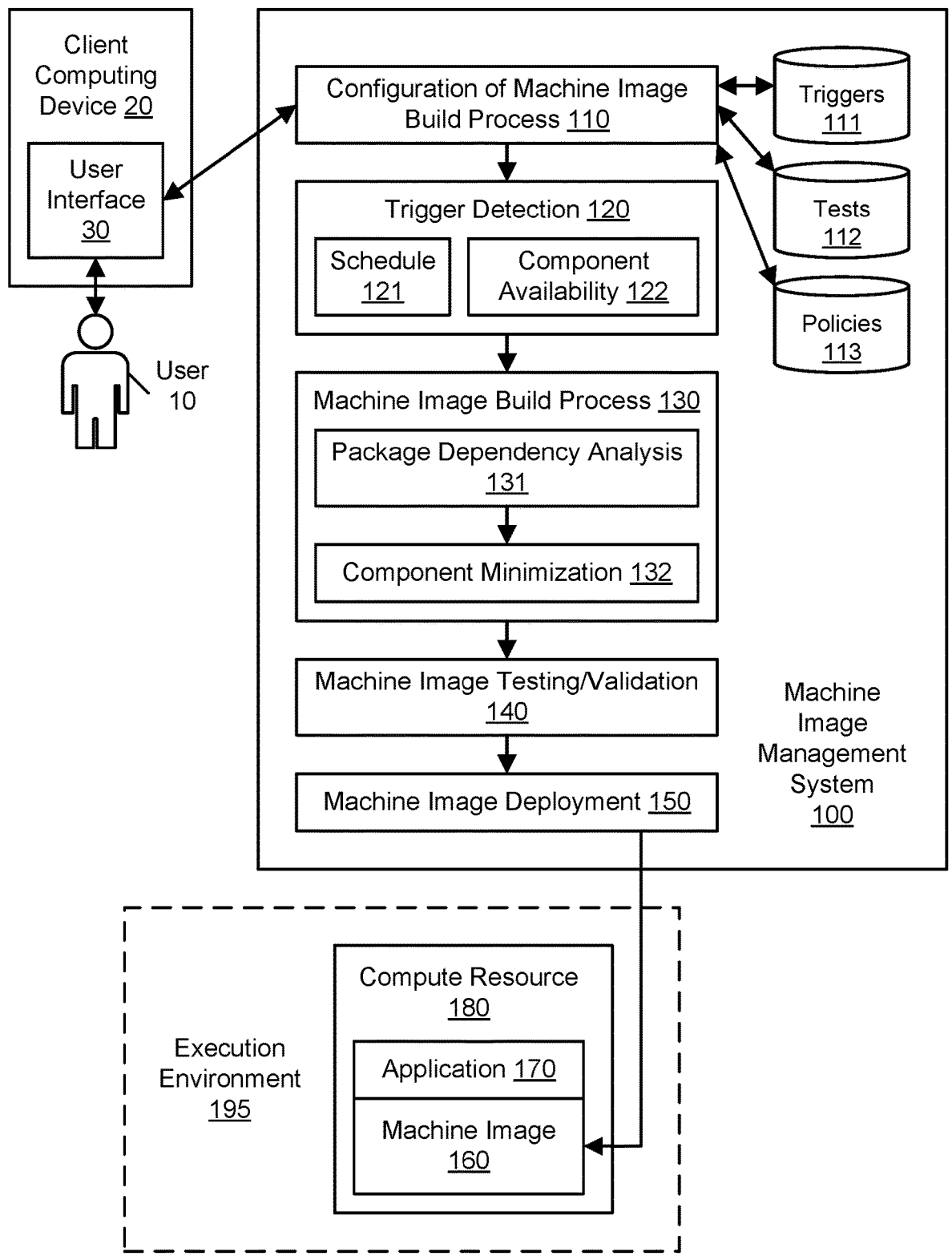
Figure 1C:
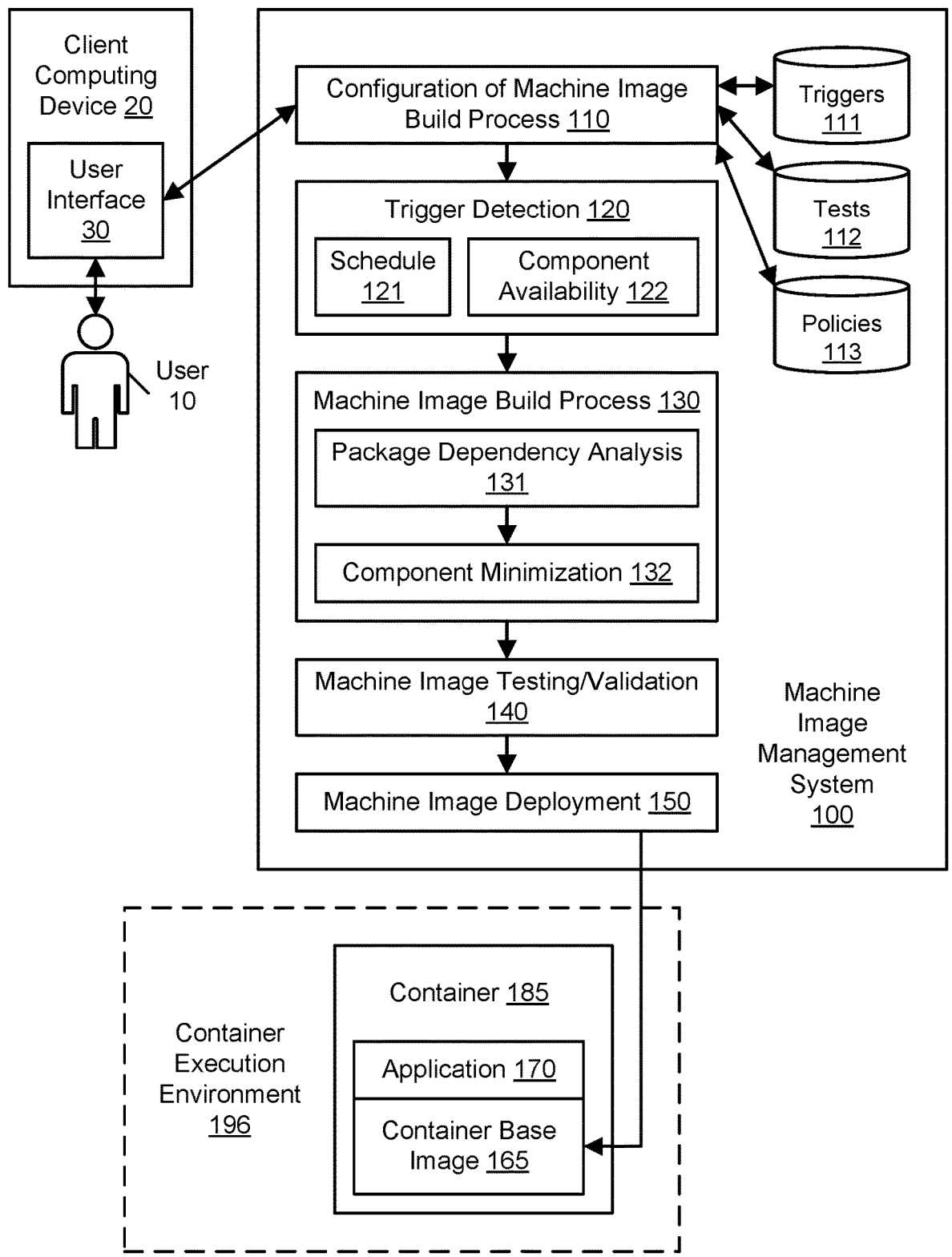

FIG. 1A, FIG. 1B, and FIG. 1C illustrate example system environments for automated management of machine images, according to some embodiments. A machine image management system 100 may perform automated tasks for building, testing, validating, and deploying machine images. The system may create and implement account-specific or image-specific pipelines for producing machine images. A pipeline may include steps or stages associated with triggering a build process, performing the build process, testing the build, validating the build, deploying the build, and so on. The system 100 may produce "golden" machine images that pre-installed and pre-configured with software and settings to meet an organization's standards. The system 100 may minimize the need for manual oversight of building and rebuilding machine images according to organizational and industry standards.

Prior to performing a machine image build process 130 based (at least in part) on automated detection 120 of a trigger, the system 100 may perform configuration 110 of the build process. The configuration 110 of the machine image build process 130 may be determined based (at least in part) on interactions between the machine image management system 100 and one or more users (e.g., developers, administrators, compliance experts, and so on) via a user interface 30. As shown in FIG. 1, at least a portion of the user interface 30 may be implemented on a client computing device 20. The client device 20 may include sufficient input and output components to permit interaction between the machine image management system 100 and a user 10 via the user interface. One or more users such as user 10 may be associated with a user account with a provider network 190. The user interface 30 may permit a user 10 to provide user input specifying or approving aspects of the configuration of the machine image build process. For example, the user 10 may provide or select one or more triggers 111 for the build process, one or more tests 112 for the build process, and/or one or more policies 113 for the build process. In some embodiments, any of the triggers 111, tests 112, and policies 113 may be selected from repositories of available triggers, tests, and policies. Selected triggers, tests, and/or policies may be customized by the user 10. In some embodiments, users may provide or otherwise indicate their own custom triggers 111, tests 112, and/or policies 113. The configuration 110 may include specifying the operating system type, the image to be generated, software components (e.g., packages) of an application to run on the image, and so on.

In one embodiment, the user interface 30 may include a command-line interface (CLI) in which textual prompts are displayed to the user, and textual responses to those prompts are received from the user. In one embodiment, the user interface 30 may include a graphical user interface (GUI) in which GUI elements representing prompts are displayed to the user, and responses to those prompts (e.g., user interaction with GUI elements such as checkboxes and text entry panes) are received from the user. In one embodiment, the user interface 30 may include a voice-enabled interface in which audio prompts are displayed to the user, and voice responses to those prompts are received from the user. In some embodiments, the GUI and/or voice-enabled interface may be built on top of the CLI. In some embodiments, the system 100 may offer an application programming interface (API) or other programmatic interface that permits other components to invoke the functionality of the system to build and configure aspects of a machine image build process. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

The machine image build process 130 may be configured in an application-specific manner. The build process may be configured to support execution of a particular one or more applications such as application 170. The application 170 may include a service that collaborates with other services according to a service-oriented architecture. The build process 130 may be account-specific and may be configured for a particular account, e.g., an account with a multi-tenant provider network 190 that offers virtualized compute resources 192, virtualized storage resources 193, and/or other services and resources to multiple tenants. The build process 130 may be configured by one or more users (e.g., developers, administrators, compliance experts, and so on) associated with the account. For example, a user 10 may configure an automated pipeline using an intuitive wizard or other user interface provided by a machine image management system. One or more software packages associated with the application 170 may be provided to the build process 130, or references to those packages may be provided. A particular operating system or operating system family for the machine image 160 may be specified by user input. One or more triggers 111 for the build process 130 may be specified by user input, or one or more default triggers 111 may be associated with the build process. If a trigger is based on a schedule 121, then the schedule may be specified by user input so that builds are updated periodically according to the schedule.

One or more policies (or policy templates) 113 may be associated with the build process. One or more policies 113 may be specified by user input, and/or one or more default policies 113 may be selected for the build process automatically, e.g., based on the solution domain to which the particular application 170 belongs. For example, if the application handles credit card numbers, then a Payment Card Industry Data Security Standard (PCI DSS) policy may be selected by a user 10 (e.g., from a list of built-in policies) or selected automatically by the machine image management system. As another example, if the application handles healthcare data, then a Health Insurance Portability and Accountability Act (HIPAA) policy may be selected by a user 10 (e.g., from a list of built-in policies) or selected automatically by the machine image management system. Applicable policies may be specific to an organization associated with the account, e.g., internal policies for handling data securely. Applicable policies may represent industry-wide policies, e.g., PCI DSS and HIPAA policies. In some embodiments, compliance policies may be published to a marketplace by third parties, and users of the machine image management system 100 may select and/or purchase such policies from the marketplace for use in hardening their machine images.

The system 100 may perform automated trigger detection 120 for the one or more specified triggers 111 for the machine image build process 130. The trigger may represent the arrival of a particular scheduled time according to a specified schedule 121 for the build process. For example, a machine image 160 may be rebuilt on a weekly or monthly basis, and any new updates to components of the machine image since the previous build process (at an earlier schedule time) may be included in the updated machine image. The trigger may represent the availability 122 of an updated component of the machine image such as a new build of the operating system or another component of the machine image. For example, the updated component may include a pending security update, and the system 100 may automatically rebuild and deploy images every time security updates are published for a relevant operating system in order to reduce the time for which deployed applications are vulnerable to new security threats. The trigger may represent the availability 122 of a new or updated test for validating machine images, e.g., to ensure that images are compatible with particular applications or other executable components. The trigger may represent the availability 122 of a new or updated policy for validating machine images, e.g., to ensure that images are compliant with specified policies. To determine that triggers have occurred, the machine image management system 100 may monitor a clock for schedule-based triggers; monitor the state of relevant machine image components, tests, and/or policies to detect updates associated with triggers, and/or receive notifications regarding updates to relevant machine image components, tests, and/or policies (e.g., from a distributor of operating system components or a compliance team that promulgates security standards).

A machine image 160 may be built and rebuilt numerous times in response to relevant triggers. When an image is rebuilt, it may include different components or versions of components than the prior build. For example, a new version of the operating system may be published, the publishing may trigger a rebuild of the machine image, and the rebuilt machine image may include some different components than the prior version. In some embodiments, the build process 130 may be triggered in an automated manner, e.g., without the need for user input or other intervention by an end user after the configuration phase shown in 110. In some embodiments, when a trigger is determined to have occurred, a notification of the trigger or the impending build process may be generated and sent to the user account (e.g., via the user interface 30). In some embodiments, the build process 130 may be initiated only if a response to the notification or other user input is received that approves the impending build.

The machine image build process 130 may assemble relevant components into a machine image 160. The components of the machine image may include a plurality of operating system or file system components of a particular operating system. The machine image management system 100 may support machine images in one or more formats. In some embodiments, a machine image 160 may include a read-only filesystem image that includes a particular operating system (e.g., Linux, Unix, or Windows). In some embodiments, a machine image 160 may include other components necessary to support a particular service or other application 170. In some embodiments, a machine image 160 may include a template for the root volume for the compute instance 180 on which the image will run. The root volume may include, for example, an operating system and one or more applications and supporting data. In some embodiments, a machine image 160 may include or be associated with launch permissions that control which accounts in the provider network are permitted to use the machine image to launch instances. In some embodiments, a machine image 160 may include a block device mapping that specifies one or more volumes to attach to the instance upon launch. In some embodiments, the filesystem or other components of the machine image 160 may be compressed, encrypted, and signed. In some embodiments, the filesystem or other components of the machine image 160 may be stored in a particular bucket or other storage location of a storage service of the multi-tenant provider network 190. In some embodiments, the filesystem may be split into a series of chunks (e.g., no more than 10 MB each). Metadata such as an XML manifest file may store information descriptive of the machine image 160, such as the name, version, architecture, default kernel ID, decryption key, digests for the filesystem chunks, and so on. In some embodiments, a machine image 160 may include a pointer to a kernel ID rather than a kernel image. The kernel ID may be selected from an approved list of safe kernels.

In some embodiments, machine images may be used to support containerized applications or tasks within a container rather than a virtual machine. A container, as referred to herein, packages up code and all its dependencies so an application (also referred to as a task, pod, or cluster) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the machine image build process 130 may be performed according to one or more policies 113 indicated by the user account 10, or the configuration of the trigger(s) may reflect such policies. Policies 113 for the machine image build process 130 may represent constraints. For example, a user 10 may apply a semantic version filter to operating system resources (e.g., such that only components released during a particular time frame or having a particular pattern in their version numbers) to restrict the components that are included in a machine image and/or to trigger a machine image build process only when newly available components satisfy the filter.

In some embodiments, at least some of the components included in the machine image 160 may be determined according to the requirements of the particular application 170. One or more software packages of the application may be subjected to static analysis in order to identify dependencies of those packages on particular components. The generated machine image 160 may include those components on which the application is dependent and exclude other components (e.g., components of the operating system that are not needed to run the application). Using a component 131 for package dependency analysis 131, dependencies of the application package(s) on operating system packages or other operating system components may first be determined, e.g., using static analysis. In some embodiments, for a given package, the dependency analysis 131 may analyze package metadata that indicates the names, versions, and/or other information identifying other packages on which the package depends. The operating system packages or components may, in turn, have their own dependencies, such that the dependencies can be represented using a dependency tree or other data structure. The dependency analysis 131 may recursively walk the dependency tree to identify components of the operating system that may be used in executing the application. For example, if the application 170 is Java-based, then various Java components from the operating system distribution may be included in the machine image, but extraneous components for other programming languages or execution environments (e.g., Perl, Docker, and so on) that are included in the operating system distribution may be excluded from the machine image. Component minimization 132 may be performed based (at least in part) on the dependency analysis 131 to restrict the contents of the machine image 160 to necessary components, including components on which the application is dependent as well as core operating system components (regardless of whether the core components are indicated by analysis of the package dependencies). By restricting machine images to a minimal set of "just enough" components and excluding other components, the build process 130 may improve the security and performance of the machine image 160 and/or application 170 while also reducing the use of storage resources for storing the machine image and reducing the use of network resources for transmitting the machine image.

Using a component 140 for machine image testing/validation, the system 100 may test the machine image 160 for usability with a particular application 170. For example, the system 100 may perform testing of the machine image 160 to attempt to validate that the image contains sufficient operating system components to support execution of the application 170. The testing may use knowledge of application dependencies, e.g., as identified using static analysis of application packages. If the machine image does not pass the testing, then the system 100 may report an error to the account associated with the build process 130 and may discontinue or abandon the build process without deploying the failed machine image build. The error notification may indicate one or more reasons for the failure of the build process 130. Further distribution of the machine image 160 may be dependent upon success of the machine image testing/validation 140 for usability with one or more applications.

If any policies are applicable to the machine image 160, e.g., as specified in the configuration 110 of the build process, then the system 100 may use the component 140 for machine image testing/validation to attempt to validate the machine image against one or more applicable policies. For example, as discussed above, applicable policies may be specific to an organization associated with the user account, e.g., internal policies for handling data securely or mitigating known security vulnerabilities. Applicable policies may represent industry-wide policies. For example, a HIPAA policy may require that everything on the local file system is encrypted. As another example, a PCI DSS policy may require that a particular set of ports be locked down. If the machine image 160 does not pass the validation, then the system 100 may report an error to the account associated with the build process 130 and may discontinue or abandon the build process without deploying the failed machine image build. The error notification may indicate one or more reasons for the failure of the build process 130. Further distribution of the machine image 160 may be dependent upon success of the machine image testing/validation 140 for policy compliance.

If the machine image 140 has passed the testing and validation, then using a component 150 for machine image deployment, the system 100 may deploy the image for use in executing the particular application 170. The machine image 160 may be deployed by sending it to one or more recipients. The recipient(s) may include one or more accounts with the provider network 190, one or more storage locations or other systems in the provider network 190, and/or one or more systems or locations external to the provider network 190 or external to the system 100. The machine image 160 may be distributed to recipients such as one or more other services of the provider network 190, e.g., a managed application streaming service or other cloud-based application hosting service. The machine image 160 may be deployed to one or more accounts in the multi-tenant provider network 190 that have sufficient access privileges to use the machine image. For example, the machine image 160 may be usable by the account associated with the configuration 110 of the build process 130 and potentially with other accounts according to the configuration of the build process. The machine image 160 may be deployed across one or more regions of the provider network 190, e.g., as specified in configuration data for the build process 130. Deploying the machine image 160 to a compute instance 180 may include storing the image on storage locally accessible to the instance.

The machine image 160 may be provided to one or more compute resources (e.g., virtual compute instances) associated with the one or more accounts, such as compute instance 180. As shown in FIG. 1A, the compute instance 180 may be implemented using resources of a provider network 190. The compute instance 180 may represent a virtual compute instance, and the machine image may represent a virtual machine image file suitable for launching the virtual compute instance. The compute instance 180 may represent a physical compute instance, and the machine image may represent an ISO image file suitable for launching a "bare metal" compute instance. The provider network 190 may represent a network set up by an entity such as a company or a public-sector organization to provide one or more services (such as various types of network-accessible computing or storage) accessible via the Internet and/or other networks to a distributed set of clients. The provider network 190 may include numerous data centers hosting various resource pools 191, such as collections of physical and/or virtualized computer servers or other compute resources 192, storage resources 193, networking equipment and the like, that are used to implement and distribute the infrastructure and services offered by the provider. The compute resources 192 may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) concurrently or serially, the provider network may be said to offer multi-tenancy and may be termed a multi-tenant provider network. Aspects of the provider network 190 may be hosted in the cloud, and the network may be termed a cloud-based provider network.

A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. In the context of the disclosed automated image generation techniques, customers of the cloud provider network may specify one or more regions and/or edge locations to which the generated images should be deployed, thereby causing the images to be transmitted to storage in these specified locations for use in launching compute resources in the specified locations.

As shown in FIG. 1B, the compute instance 180 may be implemented in an execution environment 195. In various embodiments, the execution environment 195 may be located within the same network as the system 100 or in an external network. For example, the execution environment 195 may be located on customer premises, while the system 100 may be hosted by a service provider in the cloud. In such circumstances, the execution environment 195 and the system 100 may communicate via one or more intermediate networks such as the Internet and/or one or more private channels.

As shown in FIG. 1C, the machine image produced by the system 100 may represent a container base image 165 that is deployed to a container execution environment 196. Within a container 185, the application 170 may be executed on top of the container base image 165. The container base image 165 may include components supporting the building of the container 185 and the execution of the particular application 170. However, the container 185 may run on an operating system kernel that is not included in the container base image 185. In various embodiments, the container execution environment 196 may be located within the same provider network as the system 100 or in an external network (e.g., on customer premises).

In some embodiments, the machine image 160 may represent the output of one pipeline and the input to another pipeline. Pipelines may be related to each other in a hierarchy. For example, the machine image may be output by a machine image build pipeline and provided to another (e.g., user-managed) pipeline that performs additional customization, validation, or testing against a set of requirements before using the machine image in production. The output of the first pipeline may represent a "golden" machine image that is approved for use in numerous environments and scenarios, and the output of the second pipeline may represent a customized version of the golden image. In some embodiments, the machine image management system 100 may store metadata for machine images that is usable to trace the lineage of the images in an authoritative manner. For example, the lineage of a first machine image may be traced back to a golden machine image that was modified to produce the first image.

The one or more compute instances such as instance 180 may be launched using the machine image 160 to support execution of one or more applications such as application 170. Launching a compute instance 180 using a machine image 160 may include retrieving and executing software from the root volume of the machine image. For example, the machine image 160 may be booted with the operating system included on the machine image, and after the operating system is running, one or more applications included on the machine image (or provided by a user) may be executed. Launching a compute instance 180 using a machine image 160 may include confirming that the corresponding account has sufficient access privileges to run the image as indicated by the launch permissions for the image. Launching a compute instance 180 using a machine image 160 may include attaching one or more volumes according to a block device mapping indicated in the machine image. In some embodiments, a machine image 160 may be signed by cryptographically generating a hash of the state of the image. On launch, the current state of the machine image 160 may be verified using the hash to confirm that the image has not been modified. If the image has been modified, then the launching of the virtual machine 160 may be discontinued. By streamlining and automating the building, validation, testing, and distribution of machine images as shown in FIG. 1A and FIG. 1B, the system 100 may improve the security and quality of application execution and also reduce the use of time and resources by both users and computer systems.

Figure 6:
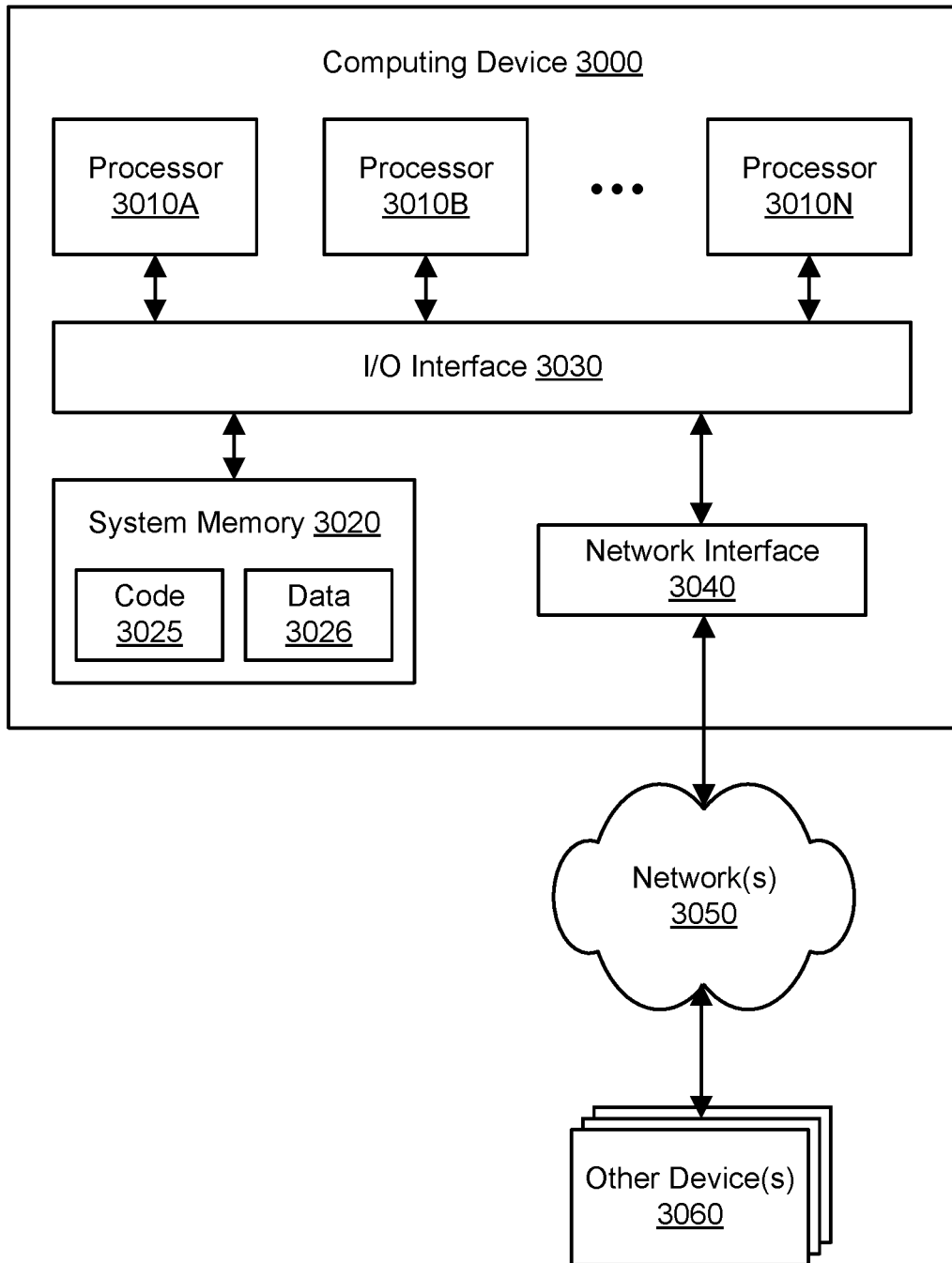
FIG. 6 illustrates an example computing device that may be used in some embodiments.

The machine image management system 100 and compute instance 180 may be implemented using any suitable number and configuration of computing devices, any of which may be implemented by the example computing device 3000 illustrated in FIG. 6. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

One or more components of the system 100 may be implemented in a service-oriented system in which multiple services collaborate according to a service-oriented architecture. In such an environment, the system 100 may offer its functionality as a service to multiple clients. To enable clients to invoke its functionality, the system 100 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of the system 100 may be offered to clients in exchange for fees, or the cost associated with performing a selection of catalog items using the system 100 may be assessed to a responsible entity. In some embodiments, clients of the system 100 may represent different business entities than the entity that operates the system 100.

Components of the system 100 as well as its clients and other services may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

Figure 2:
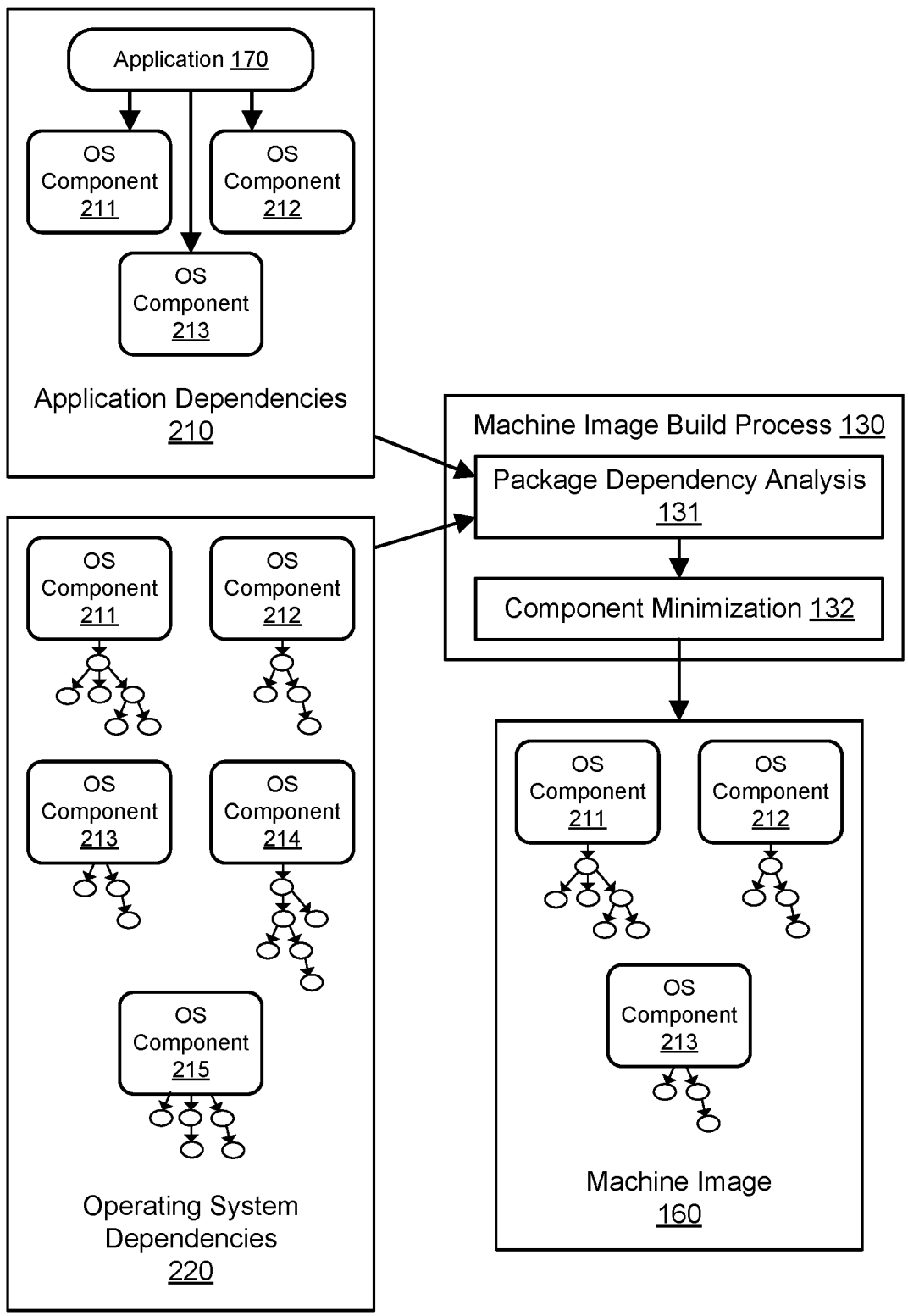
FIG. 2 illustrates further aspects of the example system environment(s) for automated management of machine images, including minimization of machine image components according to application requirements, according to some embodiments.

FIG. 2 illustrates further aspects of the example system environment(s) for automated management of machine images, including minimization of machine image components according to application requirements, according to some embodiments. As discussed above, at least some of the components included in the machine image 160 may be determined according to the requirements of the particular application 170. One or more software packages of the application may be subjected to static analysis in order to identify dependencies 210 of those packages on particular components. The generated machine image 160 may include those components on which the application is dependent and exclude other components (e.g., components of the operating system that are not needed to run the application). Using a component 131 for package dependency analysis 131, dependencies 210 of the application package(s) on operating system packages or other operating system components may first be determined, e.g., using static analysis. In some embodiments, for a given package, the dependency analysis 131 may analyze package metadata that indicates the names, versions, and/or other information identifying other packages on which the package depends. As shown in the example of FIG. 2, the application 170 may be dependent on operating system (OS) components 211, 212, and 213.

The operating system packages or components may, in turn, have their own dependencies 220, such that the dependencies can be represented using one or more dependency trees, graphs, or other data structures. The dependency analysis 131 may recursively walk the dependency tree(s) to identify components of the operating system that may be used in executing the application 170. As shown in the example of FIG. 2, the dependency analysis 131 may determine that the OS component 211 is dependent on a first set of additional components, the OS component 212 is dependent on a second set of additional components, and the OS component 213 is dependent on a third set of additional components. Component minimization 132 may be performed based (at least in part) on the dependency analysis 131 to restrict the contents of the machine image 160 to necessary components. As shown in the example of FIG. 2, the resulting machine image 160 may include the OS component 211 and the first set of additional components, the OS component 212 and the second set of additional components, and the OS component 213 and the third set of additional components. However, the machine image 160 may not include OS component 214 and its dependencies or OS component 215 or its dependencies because those components were not encountered in walking the dependency tree(s) originating with the dependencies 210 of the application 170. For example, if the application 170 is Java-based, then various Java components from the operating system distribution may be included in the machine image 160, but extraneous components for other programming languages or execution environments (e.g., Perl, Docker, and so on) that are included in the operating system distribution may be excluded from the machine image.

Figure 3:
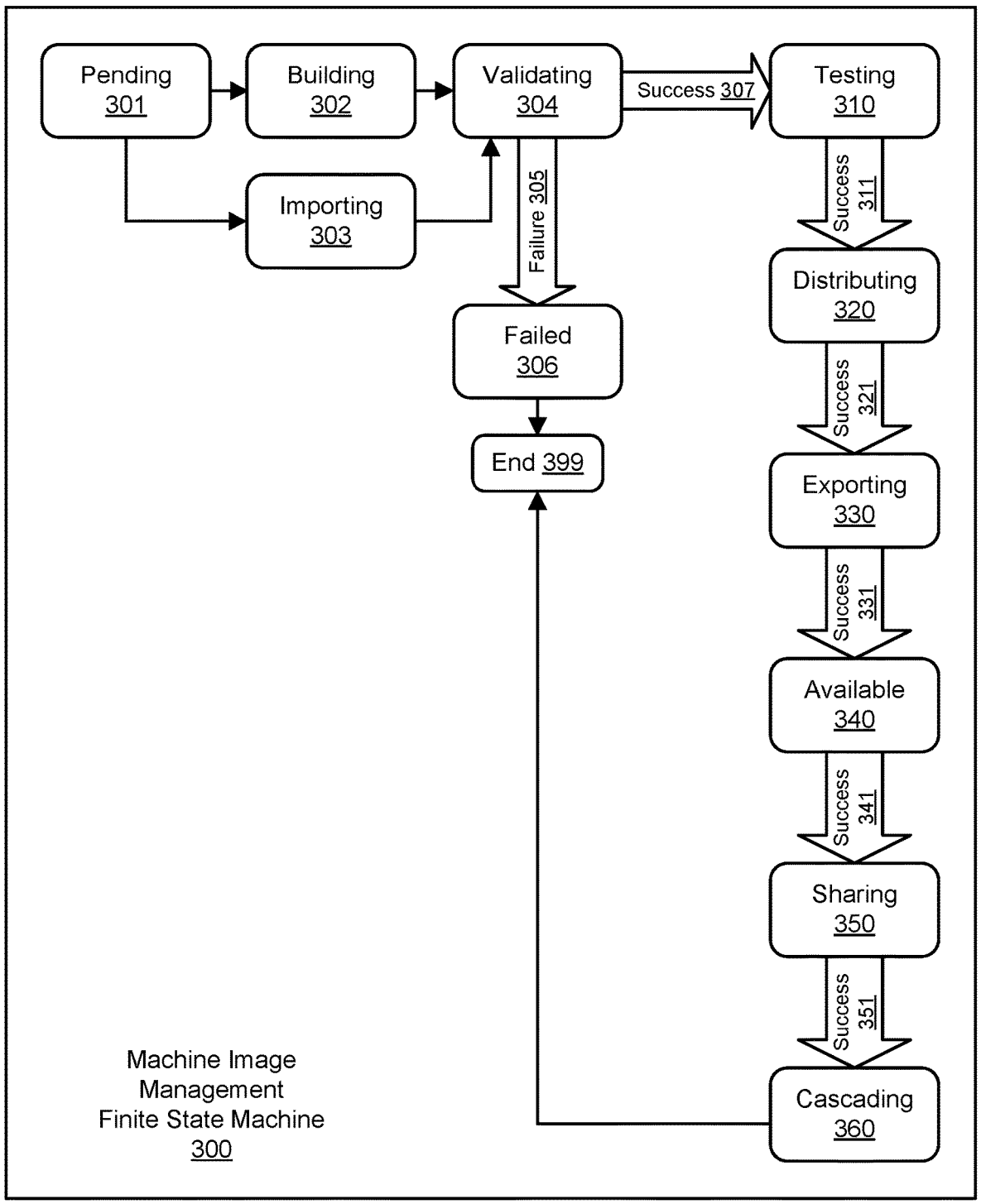
FIG. 3 illustrates a finite state machine usable for modeling different phases of automated management of machine images, according to some embodiments.

FIG. 3 illustrates a finite state machine usable for modeling different phases of automated management of machine images, according to some embodiments. The finite state machine 300 may include a set of states, and the states may represent different phases or tasks of a workflow or pipeline associated with a machine image build. In some embodiments, at least some of the phases may be implemented using a serverless compute service offered by the provider network 190 that performs tasks on behalf of clients using compute resources managed by the service. In some embodiments, the tasks may be designed to be idempotent. Validation to determine the success or failure of a phase may be performed for one or more of the illustrated states.

In a pending state 301, the workflow may determine which resource versions to associate with a build. The resource versions may generally include the latest parent image and asset versions that match any semantic version filters. The list may be further filtered by which versions the customer has access to (sharing), and the list may exclude any resources that were built outside of the pipeline's delay window. The delay window may represent a property that the customer can configure to avoid pulling in the newest changes. A build may also be aborted at this point if there are no longer any pending changes, e.g., if a resource that triggered a build schedule is no longer accessible to the customer, or if the customer initiated a manual build prior to the scheduled build being executed.

In a building state 302, the build engine may start the machine image build workflow using the dependency closure that was calculated in the pending phase. In an importing state 303, the workflow engine may import an existing machine image into a compute instance of the provider network 190 using a virtual machine import/export service. A validating state 304 may ensure that the image built or imported in the previous phase was completed successfully. Failure 305 of the validating state 304 may transition the finite state machine 300 to a failed state 306, at which point the workflow may end 399. Success 307 of the validating state 304 may transition the finite state machine 300 to a testing state 310. If the customer has associated tests with their image build pipeline, then this phase 310 may run those tests using a testing microservice. Success 311 of the testing state 310 may transition the finite state machine 300 to a distributing state 320. In the distributing state 320, the machine image may be distributed across regions of the provider network 190 as per the customer's configuration. The workflow engine may delegate this work to a distribution service. Success 321 of the distributing state 320 may transition the finite state machine 300 to an exporting state 330. The exporting state 330 may be used for customers that are exporting their machine image to another service in the provider network. Success 331 of the exporting state 330 may transition the finite state machine 300 to an available state 340 in which the image is usable for cascading. Success 341 of the available state 340 may transition the finite state machine 300 to a sharing state 350.

In the sharing state 350, the workflow engine may share the created image with customers that the pipeline owner has configured as consumers. These customers may be able to use this image as a parent image in their recipes, thereby enabling automated cascading. Success 351 of the sharing state 350 may transition the finite state machine 300 to a cascading state 360. In the cascading state, the workflow may notify an image scheduler to schedule cascading builds for all consumers of this image.

Figure 4:
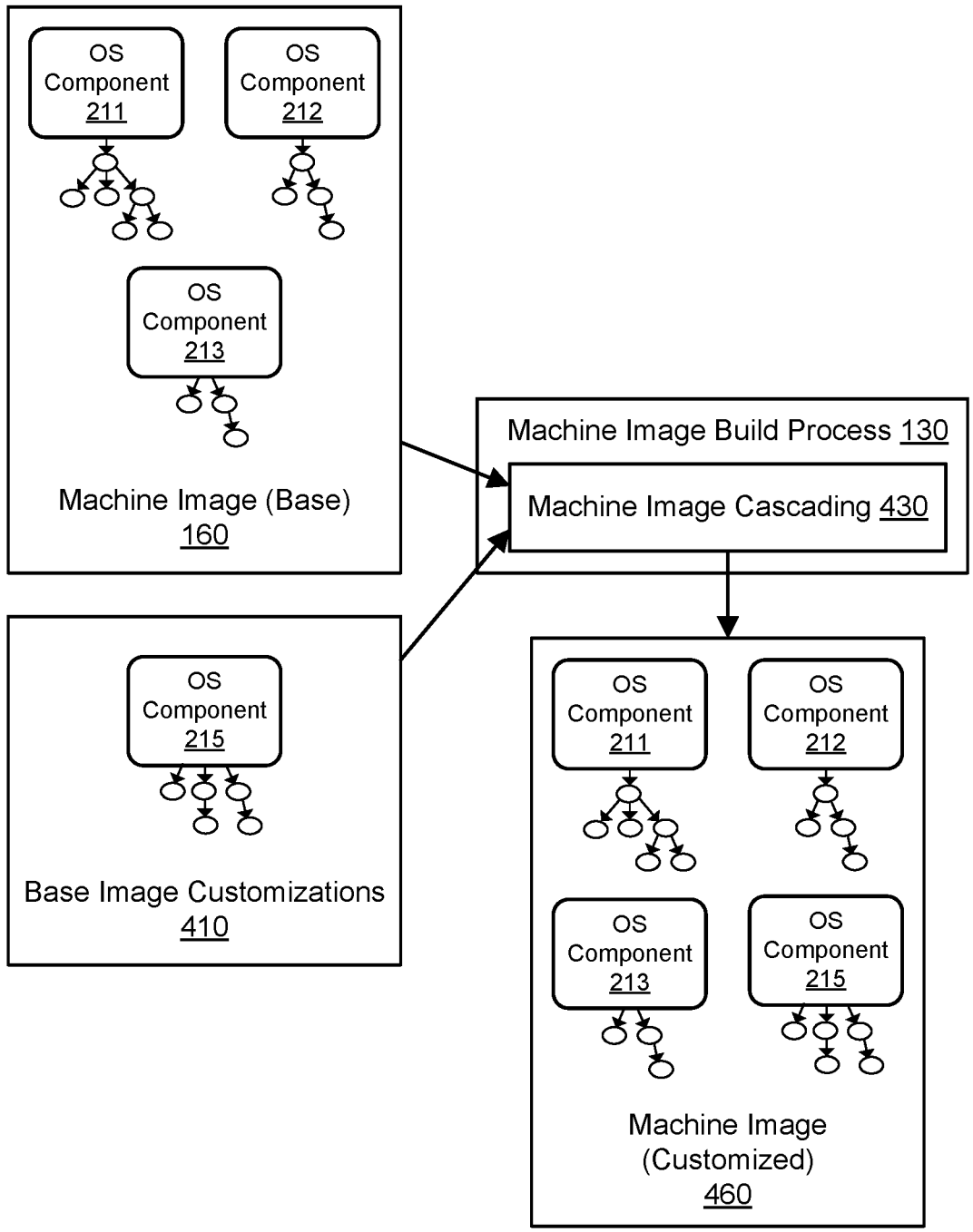
FIG. 4 illustrates further aspects of the example system environment(s) for automated management of machine images, including cascading machine images, according to some embodiments.

FIG. 4 illustrates further aspects of the example system environment(s) for automated management of machine images, including cascading machine images, according to some embodiments. As discussed above, cascading builds may represent further customization of a machine image such as a "golden" image. Numerous levels of cascading may be performed such that an image is customized again with each step. The lineage of machine images produced with cascading may be maintained to produce an authoritative history of a given image. An image may be defined by a recipe that indicates the base image on top of which customizations are applied. A recipe may also define the set of assets or software configurations that will be used to configure the image. Such dependencies may be defined using resource identifiers that may be versioned with floating semantic version filters. As shown in FIG. 4, the base machine image 160 may be provided to a build process 130 to perform machine image cascading 430. The base image 160 may be customized using one or more base image customizations 410 to produce a customized machine image 460. For example, the customizations 410 may include an additional OS components and its dependencies that were not included in the base image 160. In some embodiments, some machine image builds may be public and not limited to a set of users, but such public builds may be customized using cascading 430 to produce private builds whose usage is restricted.

Figure 5:
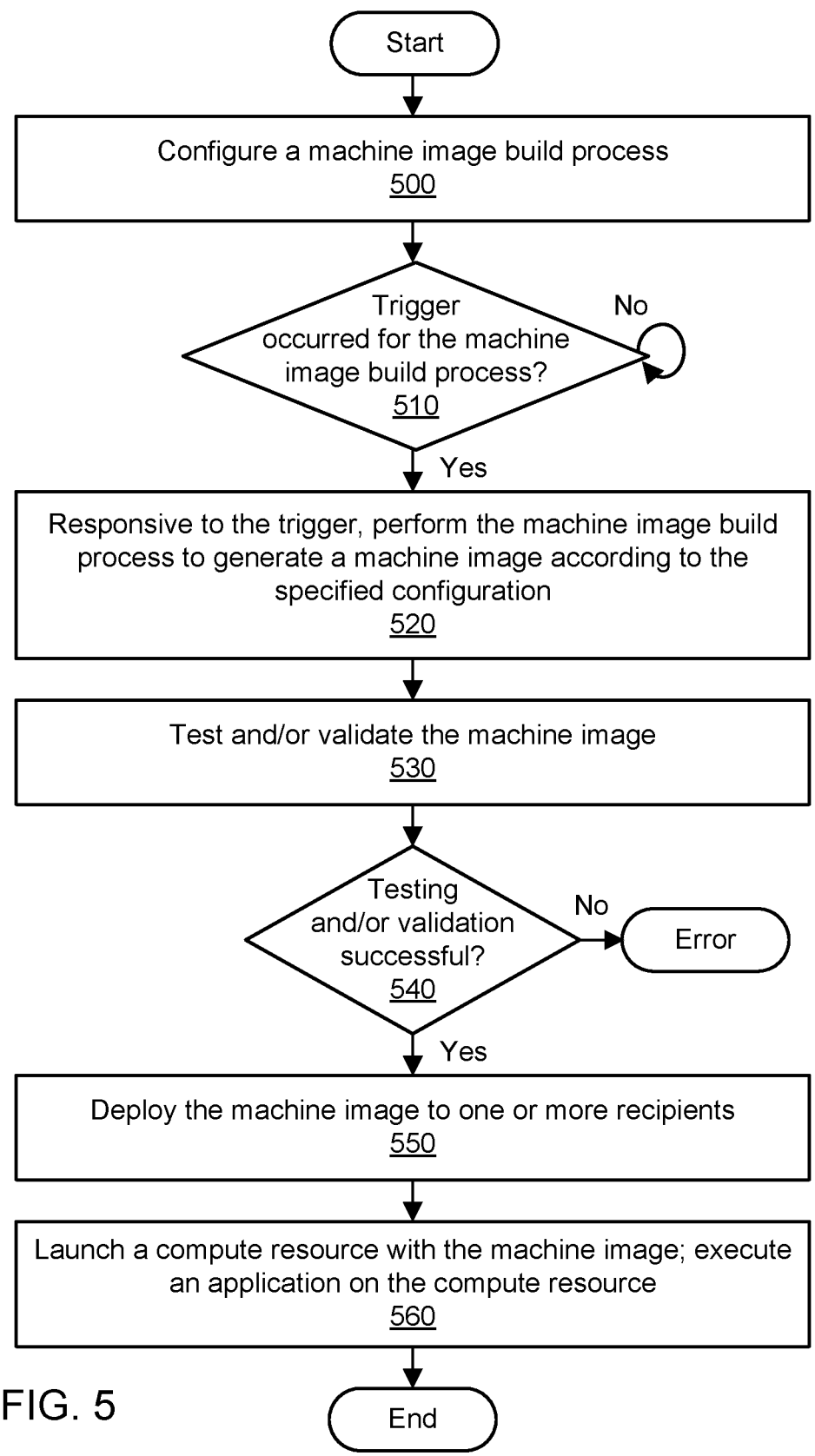
FIG. 5 is a flowchart illustrating a method for automated management of machine images, according to some embodiments.

FIG. 5 is a flowchart illustrating a method for automated management of machine images, according to some embodiments. As shown in 500, a machine image build process may be configured. The build process may be application-specific and may be configured to support execution of a particular one or more applications. The application(s) may include a service that collaborates with other services according to a service-oriented architecture. The build process may be account-specific and may be configured for a particular account, e.g., an account with a multi-tenant provider network that offers virtualized compute resources and/or virtualized storage resources to multiple tenants. The build process may be configured by one or more users (e.g., developers, administrators, compliance experts, and so on)

associated with the account. For example, a user may configure an automated pipeline using an intuitive wizard or other user interface provided by a machine image management system. One or more software packages associated with the application(s) may be provided to the build process, or references to those packages may be provided. A particular operating system or operating system family for the machine image may be specified by user input. One or more triggers for the build process may be specified by user input, or one or more default triggers may be associated with the build process. If a trigger is based on a schedule, then the schedule may be specified by user input so that builds are updated periodically according to the schedule.

One or more policies (or policy templates) may be associated with the build process. One or more policies may be specified by user input, and/or one or more default policies may be selected for the build process automatically, e.g., based on the solution domain to which the particular application belongs. For example, if the application handles credit card numbers, then a Payment Card Industry Data Security Standard (PCI DSS) policy may be selected by a user (e.g., from a list of built-in policies) or selected automatically by the machine image management system. As another example, if the application handles healthcare data, then a Health Insurance Portability and Accountability Act (HIPAA) policy may be selected by a user (e.g., from a list of built-in policies) or selected automatically by the machine image management system. Applicable policies may be specific to an organization associated with the account, e.g., internal policies for handling data securely. Applicable policies may represent industry-wide policies, e.g., PCI DSS and HIPAA policies. In some embodiments, compliance policies may be published to a marketplace by third parties, and users of the machine image management system may select and/or purchase such policies from the marketplace for use in hardening their machine images.

As shown in 510, the method may wait for a trigger to occur. The method may automatically determine that one of the specified triggers for the build process has occurred at some point in time. The trigger may represent the arrival of a particular scheduled time according to a specified schedule for the build process. For example, a machine image may be rebuilt on a weekly or monthly basis, and any new updates to components of the machine image since the previous build process (at an earlier schedule time) may be included in the updated machine image. The trigger may represent the availability of an updated component of the machine image such as a new build of the operating system or another component of the machine image. The trigger may represent the availability of a new or updated test for validating machine images, e.g., to ensure that images are compatible with particular applications or other executable components. The trigger may represent the availability of a new or updated policy for validating machine images, e.g., to ensure that images are compliant with specified policies. To determine that triggers have occurred, a machine image management system may monitor a clock for schedule-based triggers; monitor the state of relevant machine image components, tests, and/or policies to detect updates associated with triggers, and/or receive notifications regarding updates to relevant machine image components, tests, and/or policies (e.g., from a distributor of operating system components or a compliance team that promulgates security standards).

A machine image may be built and rebuilt numerous times in response to relevant triggers. When an image is rebuilt, it may include different components or versions of components than the prior build. For example, a new version of the operating system or a security update may be published, the publishing may trigger a rebuild of the machine image, and the rebuilt machine image may include some different components than the prior version. In some embodiments, the build process may be triggered in an automated manner, e.g., without the need for user input or other intervention by an end user after the configuration phase shown in 500. In some embodiments, when a trigger is determined to have occurred, a notification of the trigger or the impending build process may be generated and sent to the account. In some embodiments, the build process may be initiated only if a response to the notification or other user input is received that approves the impending build.

As shown in 520, the method may perform the machine image build process in an automated manner. The machine image build process may assemble relevant components into a machine image. The components of the machine image may include a plurality of operating system or file system components of a particular operating system. The machine image management system may support machine images in one or more formats. In some embodiments, a machine image may include a read-only filesystem image that includes a particular operating system (e.g., Linux, Unix, or Windows). In some embodiments, a machine image may include other components necessary to support a particular service or other application. In some embodiments, a machine image may include a template for the root volume for the compute instance on which the image will run. The root volume may include, for example, an operating system and one or more applications and supporting data. In some embodiments, a machine image may include or be associated with launch permissions that control which accounts in the provider network are permitted to use the machine image to launch instances. In some embodiments, a machine image may include a block device mapping that specifies one or more volumes to attach to the instance upon launch. In some embodiments, the filesystem or other components of the machine image may be compressed, encrypted, and signed. In some embodiments, the filesystem or other components of the machine image may be stored in a particular bucket or other storage location of a storage service of the multitenant provider network. In some embodiments, the filesystem may be split into a series of chunks (e.g., no more than 10 MB each). Metadata such as an XML manifest file may store information descriptive of the machine image, such as the name, version, architecture, default kernel ID, decryption key, digests for the filesystem chunks, and so on. In some embodiments, a machine image may include a pointer to a kernel ID rather than a kernel image. The kernel ID may be selected from an approved list of safe kernels. In some embodiments, machine images may be used to support containerized applications or tasks within a container rather than a virtual machine.

In some embodiments, the machine image build process may be performed according to one or more policies indicated by the user account, or the configuration of the trigger(s) may reflect such policies. Policies for the machine image build process may represent constraints. In some embodiments, the user may apply a semantic version filter to operating system resources (e.g., such that only components released during a particular time frame or having a particular pattern in their version numbers) to restrict the components that are included in a machine image and/or to trigger a machine image build process only when newly available components satisfy the filter.

In some embodiments, at least some of the components included in the machine image may be determined according to the requirements of the particular application. One or more software packages of the application may be subjected to static analysis in order to identify dependencies of those packages on particular components. The generated machine image may include those components on which the application is dependent and exclude other components (e.g., components of the operating system that are not needed to run the application). Dependencies of the application package(s) on operating system packages or other operating system components may first be determined, e.g., using static analysis. In some embodiments, for a given package, the method may analyze package metadata that indicates the names, versions, and/or other information identifying other packages on which the package depends. The operating system packages or components may, in turn, have their own dependencies, such that the dependencies can be represented using a dependency tree or other data structure. The method may recursively walk the dependency tree to identify components of the operating system that may be used in executing the application. For example, if the application is Java-based, then various Java components from the operating system distribution may be included in the machine image, but extraneous components for other programming languages or execution environments (e.g., Perl, Docker, and so on) that are included in the operating system distribution may be excluded from the machine image. By restricting machine images to a minimal set of "just enough" components and excluding other components, the method may improve the security and performance of the machine image and/or application while also reducing the use of storage resources for storing the machine image and reducing the use of network resources for transmitting the machine image.

As shown in 530, the method may test the machine image for usability with a particular application. For example, the method may perform testing of the machine image to attempt to validate that the image contains sufficient components to support execution of the application. The testing may use knowledge of application dependencies, e.g., as identified using static analysis of application packages. If the machine image does not pass the testing as shown in 540, then the method may report an error to the account associated with the build process and may discontinue or abandon the build process without deploying the failed machine image build. The error notification may indicate one or more reasons for the failure of the build process.

The method may determine whether any policies are applicable to the machine image, e.g., as specified in the configuration of the build process for the particular account. If so, then as also shown in 530, the method may attempt to validate the machine image against one or more applicable policies. For example, as discussed above, applicable policies may be specific to an organization associated with the account, e.g., internal policies for handling data securely or mitigating known security vulnerabilities. Applicable policies may represent industry-wide policies. For example, a HIPAA policy may require that everything on the local file system is encrypted. As another example, a PCI DSS policy may require that a particular set of ports be locked down. If the machine image does not pass the validation as shown in 540, then the method may report an error to the account associated with the build process and may discontinue or abandon the build process without deploying the failed machine image build. The error notification may indicate one or more reasons for the failure of the build process.

As shown in 550, if the machine image has passed the testing and validation, then the image may be deployed for use in executing the particular application(s). The machine image may be deployed by sending it to one or more recipients. The recipient(s) may include one or more accounts with the provider network, one or more storage locations or services in the provider network, and/or one or more systems or locations external to the provider network. The machine image may be deployed to one or more accounts in the multi-tenant provider network that have sufficient access privileges to use the machine image. For example, the machine image may be usable by the account associated with the configuration of the build process and potentially with other accounts. The machine image may be deployed across one or more regions of the provider network, e.g., as specified in configuration data for the build process. The machine image may be provided to one or more compute resources (e.g., virtual compute instances, "bare metal" physical compute instances, or container execution environments) associated with the one or more accounts. In some embodiments, the compute instances may be implemented using compute resources of the multi-tenant provider network, e.g., as virtual compute instances associated with one or more accounts in the provider network. In some embodiments, the compute instances may be implemented using compute resources external to the multi-tenant provider network, e.g., where the machine image is exported by the machine image management system to a client for use on compute instances managed by that client on client premises. Deploying the machine image to a compute resource may include storing the image on storage locally accessible to the resource.

In some embodiments, the machine image may represent the output of one pipeline and the input to another pipeline. Pipelines may be related to each other in a hierarchy. For example, the machine image may be output by a machine image build pipeline and provided to another (e.g., user-managed) pipeline that performs additional customization, validation, or testing against a set of requirements before using the machine image in production. The output of the first pipeline may represent a "golden" machine image that is approved for use in numerous environments and scenarios, and the output of the second pipeline may represent a customized version of the golden image. In some embodiments, the machine image management system may store metadata for machine images that is usable to trace the lineage of the images in an authoritative manner. For example, the lineage of a first machine image may be traced back to a golden machine image that was modified to produce the first image.

As shown in 560, the one or more compute resources may be launched using the machine image to support execution of one or more applications. Launching a compute resource using a machine image may include retrieving and executing software from the root volume of the machine image. For example, the machine image may be booted with the operating system included on the machine image, and after the operating system is running, one or more applications included on the machine image (or provided by a user) may be executed. Launching a compute resource using a machine image may include confirming that the corresponding account has sufficient access privileges to run the image as indicated by the launch permissions for the image. Launching a compute resource using a machine image may include attaching one or more volumes according to a block device mapping indicated in the machine image. In some embodiments, a machine image may be signed by cryptographically generating a hash of the state of the image. On launch, the current state of the machine image may be verified using the hash to confirm that the image has not been modified. If the image has been modified, then the launching of the virtual machine may be discontinued. By streamlining and automating the building, validation, testing, and distribution of machine images as shown in 500-560, the method may improve the security and quality of application execution and also reduce the use of time and resources by both users and computer systems.

Illustrative Computer System

In at least some embodiments, a computer system that implements a portion or all of one or more of the technologies described herein may include a computer system that includes or is configured to access one or more computer-readable media. FIG. 6 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 6 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and one or more memories to store computer-executable instructions that, when executed, cause the one or more processors to:
determine that a trigger for a machine image build process has occurred, wherein the trigger comprises an arrival of a scheduled time, an availability of one or more updated components of a machine image, or an availability of one or more updated policies or tests associated with the machine image build process;
perform the machine image build process responsive to the trigger, wherein the machine image build process generates the machine image, wherein the machine image comprises a plurality of operating system components supporting execution of an application;
perform one or more tests on the machine image, wherein the one or more tests validate, via static analysis, the components of the machine image for compliance with one or more policies that specify requirements of the components supporting execution of the application, and wherein the machine image passes the validation test based on whether the components support execution of the application according to the requirements specified in the one or more policies; and
distribute, responsive to the machine image passing the validation test for compliance with the one or more policies, the machine image to one or more compute instances in a multi-tenant provider network, wherein the one or more compute instances are launched using the machine image, and wherein the application is executed on the one or more compute instances launched using the machine image.

2. The system as recited in claim 1, wherein the plurality of operating system components are determined using a plurality of package dependencies of the application, and wherein the machine image excludes one or more additional operating system components not indicated by the plurality of package dependencies.

3. The system as recited in claim 1, wherein the one or more memories store additional computer-executable instructions that, when executed, cause the one or more processors to:
perform one or more tests on the machine image, wherein the one or more tests validate the machine image for use with the application.

4. A computer-implemented method, comprising:
determining, by a machine image management system, that a trigger for a machine image build process has occurred;
performing, by the machine image management system, the machine image build process responsive to the trigger, wherein the machine image build process generates a machine image, wherein the machine image comprises a plurality of components associated with an application;
performing, by the machine image management system, one or more tests on the machine image, wherein the one or more tests validate, via static analysis, the components of the machine image for compliance with one or more policies that specify requirements of the components supporting execution of the application, and wherein the machine image passes the validation test based on whether the components support execution of the application according to the requirements specified in the one or more policies; and
responsive to the machine image passing the validation test for compliance with the one or more policies,
sending, by the machine image management system, the machine image to one or more recipients, wherein one or more compute resources are launched using the machine image, and wherein the application is executed on the one or more compute resources launched using the machine image.

5. The method as recited in claim 4, wherein the trigger represents an arrival of a scheduled time according to a schedule, and wherein the plurality of components comprise one or more components updated after a previous machine image build process triggered by an arrival of an earlier scheduled time.

6. The method as recited in claim 4, wherein the trigger represents an availability of one or more updated components of the machine image.

7. The method as recited in claim 4, wherein the trigger represents a publishing of a security update for an operating system, and wherein the machine image comprises the security update.

8. The method as recited in claim 4, wherein the trigger represents an availability of one or more updated policies or tests associated with the machine image build process.

9. The method as recited in claim 4, wherein the plurality of components comprise operating system components determined using analysis of a plurality of package dependencies of the application, and wherein the machine image excludes one or more additional operating system components not indicated by the analysis of the plurality of package dependencies.

10. The method as recited in claim 9, wherein the machine image includes one or more core operating system components not indicated by analysis of the plurality of package dependencies.

11. The method as recited in claim 4, further comprising:
sending a notification of a pendency of the machine image build process; and
receiving a response to the notification, wherein the response comprises user input approving the machine image build process, and wherein the machine image build process is performed based at least in part on the response to the notification.

12. The method as recited in claim 4, wherein the one or more recipients comprise one or more accounts in a multi-tenant provider network, and wherein the machine image is provided to the one or more accounts based at least in part on access privileges associated with the machine image.

13. The method as recited in claim 4, wherein the one or more compute resources comprise one or more virtual compute instances implemented using compute resources of a multi-tenant provider network.

14. One or more non-transitory computer-readable storage media storing program instructions that, when executed on or across one or more processors, perform:
determining that a trigger for a machine image build process has occurred, wherein the trigger represents an arrival of a scheduled time or an availability of one or more components associated with the machine image build process;
performing the machine image build process responsive to the trigger, wherein the machine image build process generates a machine image, wherein the machine image comprises a plurality of operating system components supporting execution of an application;
performing one or more tests on the machine image, wherein the one or more tests validate, via static analysis, the components of the machine image for compliance with one or more policies that specify requirements of the components supporting execution of the application, and wherein the machine image passes the validation test based on whether the components support execution of the application according to the requirements specified in the one or more policies; and
responsive to the machine image passing the validation test for compliance with the one or more policies,
providing the machine image to an account with a provider network, wherein one or more compute resources associated with the account are launched in the provider network using the machine image, and wherein the application is executed on the one or more compute resources launched using the machine image.

15. The one or more non-transitory computer-readable storage media as recited in claim 14, wherein the trigger represents an arrival of a scheduled time according to a schedule associated with the account, and wherein the plurality of operating system components comprise one or more components updated after a previous machine image build process triggered by an arrival of an earlier scheduled time.

16. The one or more non-transitory computer-readable storage media as recited in claim 14, wherein the trigger represents an availability of one or more updated components of the machine image.

17. The one or more non-transitory computer-readable storage media as recited in claim 14, further comprising additional program instructions that, when executed on or across the one or more processors, perform:
performing an additional machine image build process responsive to generation of the machine image, wherein the additional machine image build process generates an additional machine image, wherein the additional machine image comprises a customized version of the machine image.

18. The one or more non-transitory computer-readable storage media as recited in claim 14, wherein the plurality of operating system components are determined using a plurality of package dependencies of the application, wherein the plurality of operating system components are associated with an operating system, and wherein the machine image excludes one or more additional components of the operating system that are not indicated by the plurality of package dependencies.

19. The one or more non-transitory computer-readable storage media as recited in claim 14, further comprising additional program instructions that, when executed on or across the one or more processors, perform:
performing one or more other tests on the machine image, wherein the one or more other tests validate the machine image for use with the application, and wherein the machine image is provided to the account based at least in part on success of the one or more other tests.

* * * * *